United States Patent

Mreijen

[11] Patent Number: 5,976,450
[45] Date of Patent: Nov. 2, 1999

[54] PREFORM FOR POLYESTER BOTTLE

[76] Inventor: Hubertus Mreijen, Gemullehoekenweg 34, Oisterwijk, Netherlands, 5062 CD

[21] Appl. No.: 07/856,078

[22] Filed: Jul. 13, 1992

[30] Foreign Application Priority Data

Sep. 13, 1990 [WO] WIPO .................. PCT/NL90/00131

[51] Int. Cl.$^6$ .................................................. B29C 49/42
[52] U.S. Cl. .......................................... 264/512; 427/155
[58] Field of Search ..................... 264/512, 130, 264/134, 513, 535; 425/90, 93, 522, DIG. 115; 427/256, 428, 429, 430.1, 155

[56] References Cited

U.S. PATENT DOCUMENTS

| | | | |
|---|---|---|---|
| 1,662,086 | 3/1928 | Stuhr | 118/260 |
| 3,804,663 | 4/1974 | Clark | 117/101 |
| 3,852,398 | 12/1974 | Moore | 264/535 |
| 3,886,247 | 5/1975 | Edwards | 264/535 |
| 4,127,633 | 11/1978 | Addleman | 264/97 |
| 4,254,170 | 3/1981 | Roullet et al. | 428/36 |
| 4,268,975 | 5/1981 | Schall et al. | 264/535 |
| 4,393,106 | 7/1983 | Maruhashi et al. | 264/512 |
| 4,478,889 | 10/1984 | Maruhashi et al. | 427/230 |
| 4,499,045 | 2/1985 | Obsomer | 264/532 |
| 4,525,377 | 6/1985 | Nickel et al. | 427/12 |
| 4,534,995 | 8/1985 | Pocock et al. | 427/38 |
| 4,543,277 | 9/1985 | Giles | 427/430.1 |
| 4,550,008 | 10/1985 | Shimizu | 264/527 |
| 4,962,721 | 10/1990 | Peek | 118/209 |
| 4,990,382 | 2/1991 | Weissenstein et al. | 428/35.7 |
| 5,000,905 | 3/1991 | Cox et al. | 264/535 |
| 5,051,080 | 9/1991 | Hill et al. | 425/93 |
| 5,068,078 | 11/1991 | Hill et al. | 264/512 |

FOREIGN PATENT DOCUMENTS 966009 of 1964 United Kingdom.

*Primary Examiner*—Catherine Timm
*Attorney, Agent, or Firm*—Locke Reynolds

[57] ABSTRACT

The invention relates to a preform for a polyester bottle, having applied to its surface a coating of a material that lowers the coefficient of friction of the polyester and to a method of producing a preform for a polyester bottle, provided with a coating of a material that lowers the coefficient of friction of the polyester used, comprising producing a preform by means of extrusion or injection moulding, followed by applying said coating to the preform.

5 Claims, No Drawings

PREFORM FOR POLYESTER BOTTLE

This invention relates to a preform for a polyester bottle.

In the manufacture of bottles of polyester, such as polyethylene terephthalate (PET), in principle two different types of production methods can be distinguished. Both methods start from a preform. In the first method such a preform, while still in a warm state, is directly processed by means of blow moulding to form the bottle.

In the second method the preform, after cooling, is stored, transported and the like, to be processed to form the final bottle only at a later stage or elsewhere. This means that the preform is heated to a temperature higher than the glass transition temperature of the polyester and then blown to form the final bottle. This yields a biaxial stretch of the polyester, which is partly responsible for the good properties of the polyester or PET bottle.

In this second method, however, the problem is encountered that during transport, storage, handling and the like, the preforms come into contact with each other and are damaged, at least exhibit scratches at the surface. Such surface defects of the preforms lead to surface defects at the surface of the final bottle as well.

Careful handling of the preforms can prevent the occurrence of such damage, but that is very labour-intensive, and affects the speed of production and the cost price of the bottle.

Accordingly, a method of reducing or even completely preventing such damage has been contemplated.

Surprisingly, it has been found that a very simple treatment renders the preform substantially completely insensitive to surface damage as a result of mutual contact of the preforms.

The invention concerns a preform for a polyester bottle, having applied to its surface a coating of a material that lowers the coefficient of friction of the polyester.

The invention also relates to a method of producing a preform for a polyester, preferably a polyethylene terephthalate, bottle, provided with a coating of a material that lowers the coefficient of friction of the polyester used, comprising the steps of producing a preform by extrusion or injection moulding, followed by applying said coating to said preform.

As a coating various waxlike or fatty materials can be used, but preferably a material is used from the group consisting of polyethylene wax, polypropylene wax, paraffin wax, microcrystalline wax, fats and/or oils, fatty acids and silicone oil. This group of materials gives a good protection and is generally very easy to apply to the surface. Moreover, these materials have been approved for use in food-contact applications, so that no problems need arise on that count either.

The preforms according to the invention have the advantage that when they are processed to form bottles, hardly any surface defects occur, if at all, so that the final bottle has a considerably improved appearance. Moreover, and this is highly unexpected, the coating does not affect the processing or re-processing of the polyester bottle. The coating is easy to apply and very cheap in virtue of its simplicity. Nor does sticking the labels to the bottles present any problems.

The coating can be applied to the preform in various manners, for instance by immersing the preform in a bath containing the coating. It is also possible to subject the preform to a spraying treatment with a fluid that contains the coating. Preferably, a bath is used, since the most uniform coating is obtained in that manner.

In a preferred embodiment of the invention the coating is applied in liquid form—namely, as an aqueous emulsion—to the preforms, which may optionally be still warm. The temperature of the preforms and or the coating fluid is generally between 10 and 75° C. The emulsion to be used is preferably strongly diluted. A suitable solid matter content is between 0.01 and 1% by weight. This is preferred because in that way the desired amount of coating can be controlled optimally.

The application of the emulsion is followed by drying of the preforms. Drying may for instance be effected by external heating of the moist preform. However, it is also possible to subject the preform in a warm state to the treatment, so that the drying is effected by the heat present in the preform. Once dry, the preforms are eminently protected against the occurrence of damage during transport and storage.

The amount of coating naturally depends on the total surface area of the preform and on the nature of the coating. The amount of coating in any case varies generally between 0.01 mg and 0.1 g. It is observed that the coating according to the invention cannot be compared with the known coatings on polyester bottles, as described for instance in European patent application 79.215. That application relates to a polyester bottle provided with a vinylidene chloride coating to improve the mechanical properties of the bottle. The present invention does not concern the application of a layer of a protective plastic on the final bottle, but a treatment of the preform to prevent any, particularly visual, defects. Indeed, the present invention does not generally yield a continuous plastic or other coating on the final polyester bottle.

The preform according to the invention can be processed in a conventional manner to form bottles both refillable and disposable. The presence of the coating does not have any influence on the processing of the preform during blow moulding. In the conventional manner the preform can be heated to above $T_g$, for instance by IR heating, and be further processed in the usual manner.

The invention will now be illustrated in and by some Examples, without any limitation being intended.

Comparative Example

Polyethylene terephthalate preforms were produced by injection moulding of PET in a mould suitable for the purpose. These preforms were transported in the normal manner and packed in boxes for storage and transport. During these operations the surface of the preforms frequently sustained damage. The processing of these preforms to form PET bottles by heating them and blow moulding yielded bottles with many surface defects.

EXAMPLE

By the same method as used in the Comparative Example, preforms were produced. While still warm, these preforms were then sprayed with a 0.5% by weight emulsion of polypropylene wax in water. After drying, the preforms were handled and processed to form bottles in the same manner as in the Comparative Example.

These bottles did not show any trace of surface defects, which could already be observed from the preforms. Nor did the step of forming the bottles present any problems. It should be observed in particular that prolonged processing of coated preforms did not give any problems in the mould, although one would expect the use of a coat on the preform to eventually lead to precipitation in the mould. This in turn is likely to lead to yet other surface defects on the final bottles. Such defects have not been observed.

I claim:

1. A method of forming a bottle, said method comprising the steps of:

producing a polyester preform for a bottle;

applying a protective coating of a material that lowers the coefficient of friction of the polyester on the outer surface of the preform to prevent the production of surface damage to the preform caused by mutual contact with other preforms;

allowing the coating to dry;

transporting the dried, coated preform in mutual contact with other preforms to blow mold apparatus, and blowing the preform in the blow mold apparatus to form the bottle.

2. A method as defined in claim 1, further comprising the step of choosing the coating to be of a material selected from the group consisting of polyethylene wax, polypropylene wax, paraffin wax, microcrystalline wax, fats and oils, fatty acids and silicone oil.

3. A method as defined in claim 1, further comprising the step of selecting the polyester to be polyethylene terephthalate.

4. A method as defined in claim 1, wherein the step of producing the polyester preform is accomplished by extrusion.

5. A method as defined in claim 1, wherein the step of producing a polyester preform is accomplished by injection molding.

* * * * *